July 18, 1967 L. R. WALLER 3,331,416
BUN SLICER
Filed May 26, 1965
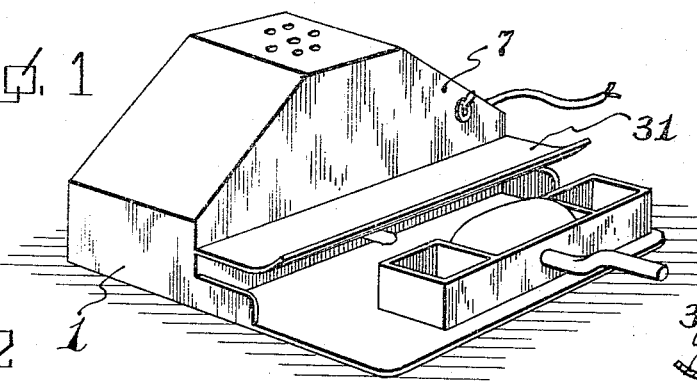
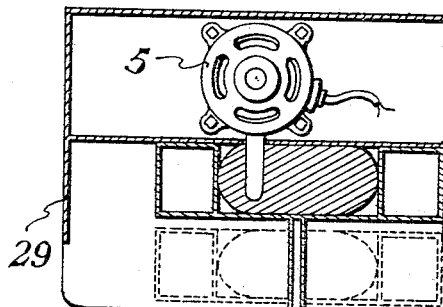
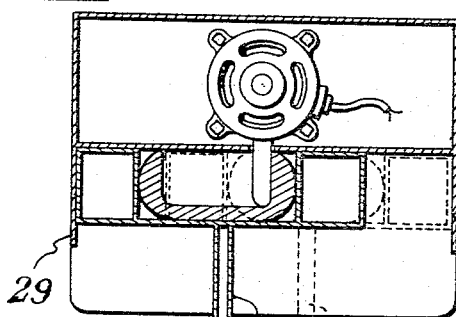
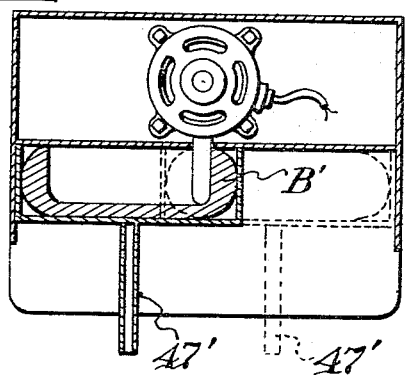
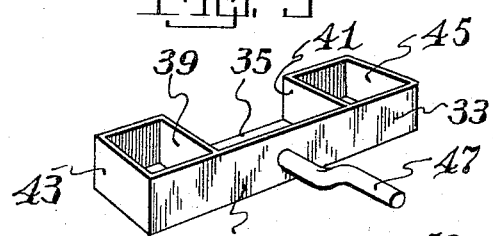
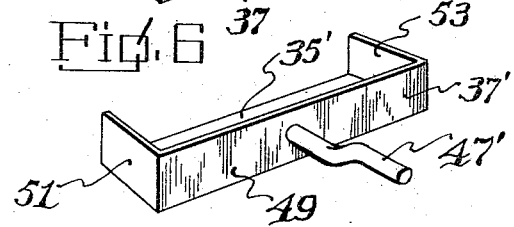
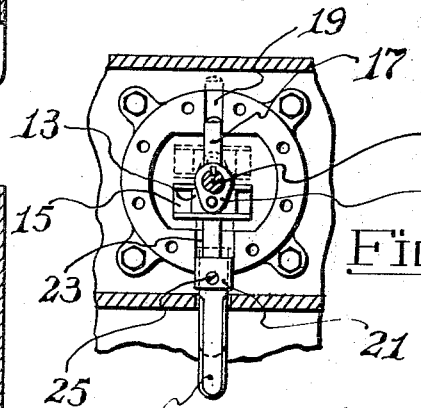
INVENTOR.
*Leo R. Waller*
BY
*Young & Thompson*
ATTORNEYS

United States Patent Office 3,331,416
Patented July 18, 1967

3,331,416
BUN SLICER
Leo R. Waller, 1229 N. Rosedale,
Tulsa, Okla. 74127
Filed May 26, 1965, Ser. No. 459,057
4 Claims. (Cl. 146—72)

The present invention relates to bun slicers more particularly of the type adapted to form a lengthwise slit in an elongated hot dog bun, without, however, slicing the bun in two.

It is an object of the present invention to provide a bun slicer that will form a lengthwise slit in an elongated hot dog bun, with the ends of the slit spaced inwardly from both ends of the bun.

Another object of the present invention is the provision of a bun slicer which can be used readily by unskilled labor to form slits of uniform dimensions in elongated hot dog buns.

Still another object of the present invention is the provision of a bun slicer adapted to be used with buns of various lengths.

Finally, it is an object of the present invention to provide a bun slicer which will be relatively simple and inexpensive to manufacture, easy to operate, maintain and repair, and rugged and durable in use.

Other objects and advantages of the present invention will become apparent from a consideration of the following description, taken in connection with the accompanying drawing, in which:

FIG. 1 is a perspective view of a bun slicer according to the present invention;

FIG. 2 is a top plan view in cross section, of the bun slicer according to the present invention in a first operative position;

FIG. 3 is a view similar to FIG. 2 but showing the apparatus in a second operative position;

FIG. 4 is a view similar to FIG. 3, but showing the invention in use in connection with longer buns than in FIGS. 2 and 3;

FIG. 5 is a fragmentary side cross-sectional view of apparatus according to the present invention;

FIG. 6 is a perpsective view of a bun carrier forming part of the present invention, as in FIGS. 2 and 3;

FIG. 7 is a view similar to FIG. 6 but showing a bun carrier as in FIG. 4; and

FIG. 8 is an enlarged fragmentary bottom plan view in cross section, showing the actuating mechanism of the knife of the present invention.

Referring now to the drawing in greater detail, there is shown a bun slicer comprising a frame 1 and having as its bun slicing element a knife 3. Knife 3 is in the form of a single flat blade disposed in a horizontal plane. A small electric motor 5 is disposed in a housing 7 of frame 1 having a front wall 8. Knife 3 projects through and beyond front wall 8.

Motor 5 has a vertically disposed drive shaft 9. An eccentric 11 is carried by drive shaft 9 and is pivotally interconnected with a slide 13 that slides horizontally reciprocably in a slideway 15. Slide 13 rotates, while slideway 15 reciprocates parallel to the length of knife 3. Slideway 15 carries a pin 17 parallel to knife 3, that slides in a recss 19 of a fixed portion of the structure. On its side opposite pin 17, slideway 15 carries a collar 21 that slides in a further fixed recess 23. A setscrew 25 extends through collar 21 and releasably retains knife 3 in collar 21. Operation of motor 5 thus causes knife 3 to reciprocate between the full and phantom lines positions shown in FIG. 8 thereby to aid in a bun slicing operation. When knife 3 becomes worn or broken or dull, setscrew 25 can be released for replacement or repair of knife 3.

Reciprocating knives as such are of course old. The novelty of the present invention resides in the environment in which knife 3 is used, and the relationship to each other of the parts with which knife 3 coacts. Thus, it will be appreciated that it is within the scope of the present invention that knife 3 be not only reciprocable but also fixed, or oscillatory or that it take other forms than that shown.

Frame 1 includes an apron 27 that extends outwardly from the base of the frame and that has a flat horizontal upper surface. Stop means 29 are disposed at either end of apron 27 and in the illustrated embodiment take the form of upstanding flanges. In preferred embodiments of the invention, knife 3 is centered midway between stop means 29 as shown in FIGS. 2–4. A holddown means 31 extends generally horizontally from end to end of and above apron 27 and above knife 3. In the illustrated embodiment, holddown means 31 is in the form of a horizontal plate having a curved outer edge that serves as a guide for the introduction of hamburger buns thereunderneath.

A bun carrier 33 is provided that is slidable on and removable from apron 27. Carrier 33 includes a flat bottom wall 35 and an upright rear wall 37. Opposite interior end walls 39 and 41 complete between them a compartment for the reception of a hamburger bun. End walls 39 ind 41 are spaced apart a distance equal to the length of the hamburger bun it is desired to slit. Preferably, the distance between the rear wall 37 and the open front of carrier 33 is about equal to the width of a hamburger bun, as is seen in FIG. 2. The height of rear wall 37 is preferably a little less than the height of the hamburger bun to be slit. It is also preferred that when carrier 33 rests on apron 27 in the position shown in FIG. 5, knife 3 be spaced midway between the upper surface of bottom wall 35 and the lower surface of holddown means 31.

Carrier 33 is also characterized by opposite outer ends 43 and 45 adapted to abut against stop means 29. A handle 47 completes the assembly which is carrier 33, and permits easy manipulation of carrier 33.

In the operation of the embodiment according to FIGS. 1–3 and FIG. 5, a relatively short hamburger bun B is inserted in carrier 33 as shown, and carrier 33 is then placed on apron 27 with an end 43 or 45 flat against one of stop means 29. Carrier 33 is then pushed toward knife 3 from the phantom line to the full line position in FIG. 2, whereupon knife 3 penetrates the bun. Knife 3 can be stationary or moving at this point. With knife 3 moving, carrier 33 is then moved to the left with the carrier 33 sliding against front wall 8 of housing 7, until end 43 contacts the other stop means 29, as shown in FIG. 3 by movement from the phantom line position to the full line position therein. Carrier 33 with its slit bun can then be removed from the frame.

The parts are so positioned that knife 3 in FIG. 2 enters bun B at a point adjacent but spaced from one end of the bun. In FIG. 3, however, upon completion of the cut, knife 3 is disposed adjacent but is spaced from the other end of bun B. A slit has thus been formed in bun B which is spaced from both ends of bun B and which does not extend all the way through bun B. Upon removal of carrier 33 and removal of bun B from carrier 33, a relatively short hot dog can thus be inserted in bun B, with relish or any other condiment, without danger of the condiment leaking out the ends of the bun. If the bun is eaten with the slit opening upwardly, there will be a minimum chance of spilling condiment from the hot dog.

To this end, therefore, the relationship of the parts to each other and to the position of knife 3 is quite important. It will be noted that the distance between wall 39 and the left hand stop means 29 when the parts are in the position shown in FIG. 2, is less than the distance between knife 3 and that stop means 29; and that the distance between wall 41 and the right hand stop means 29 is less than the distance between knife 3 and that stop means 29 in the position of the parts shown in FIG. 3. It will also be noted that the distance the carrier 33 can travel from left to right or right to left, as seen in FIGS. 2 and 3, is less than the distance between walls 39 and 41. This is to say that the distance between ends 33 and 45 is less than the distance between stop means 29 by an amount that is less than the distance between end walls 39 and 41. It is also to be noted that at the position of knife 3 in which it penetrates most deeply into bun B, the knife 3 extends beyond the front wall 8 a distance less than the depth of the recess in carrier 33 from front to rear.

In the embodiment of FIGS. 4 and 7, a carrier 49 is provided which differs from carrier 33 in that the structure that corresponds to end walls 39 and 41 has been consolidated with the structure that corresponds to ends 43 and 45. Thus, carrier 49 is provided for a longer bun B' than in the case of carrier 33, and the ends of the carrier are closed simply by end walls 51 and 53. It is to be understood that the device will be used sometimes with carriers such as 33, when it is desired to slit short buns B, and sometimes with carriers such as carrier 49, when it is desired to slit long buns B'. The relationship of the parts thus makes it possible to handle buns of a variety of lengths, with no adjustment other than a change in the carrier 33.

It will therefore be noted, that, regardless of whether carrier 33 or 49 is used, the arrangement of the parts is such that the interior end walls of the carrier are spaced apart from the means 29 farthest from them, distances which are equal in either extreme position of the carrier in the device, so that the distance between knife 3 and the immediately adjacent inner end wall of the carrier will be equal in both cases, as is seen at the central portions of FIGS. 3 and 4, so that the slit terminates equal distances from both ends of the bun.

It will also be noted that no matter how the carrier is inserted into the bun slicer, the knife 3 is always disposed within the cavity of the carrier and is therefore masked from the fingers of the operator. There is thus no way for the operator to harm himself when inserting the carrier into the device. Moreover, there is no reasonable way of contacting the knife with the carrier to the detriment of the knife or the carrier or both. In short, the present invention is virtually foolproof.

From a consideration of the foregoing disclosure, therefore, it will be apparent that all of the initially recited objects of the present invention have been achieved.

Although the present invention has been described and illustrated in connection with a preferred embodiment, it is to be understood that modifications and variations may be resorted to without departing from the spirit of the invention, as those skilled in this art will readily understand. Such modifications and variations are considered to be within the purview and scope of the present invention as defined by the appended claims.

What is claimed is:

1. A slicer for elongated buns of the hot dog type, comprising a frame, a knife supported by the frame, a bun carrier slidable on the frame for moving buns lengthwise past the knife with the knife extending partway into the bun, the carrier having an open front for receiving a bun and interior real wall means and opposite interior end wall means for retaining a bun on the carrier against substantial displacement relative to the carrier, the frame having stop means thereon for limiting said sliding movement of the carrier in both directions, one said stop means adjacent one side of the frame being disposed adjacent said one end wall means in one position of the carrier, the other said stop means adjacent the other side of the frame being disposed adjacent the other said end wall means in another position of the carrier, said one stop means and said other end wall being spaced apart a distance in said one position which is substantially equal to the distance between said other stop means and said one end wall in said other position, said distance being less than the distance between the knife and either of said end walls, the distance said carrier travels between said positions being substantially less than the distance between said end walls, and further stop means against which the front of said carrier bears during said sliding movement, the knife extending beyond said further stop means a distance substantially less than the distance between said rear wall means and said further stop means when the carrier is disposed against said further stop means.

2. A slicer as claimed in claim 1, and power means for rapidly moving the knife to facilitate the penetration of the knife into a bun.

3. A slicer as claimed in claim 1, said carrier having an open top, and holddown means adjacent and above the knife to retain buns in the space between said end wall means.

4. A slicer is claimed in claim 1, the carrier being freely movable in directions toward and away from the knife.

References Cited

UNITED STATES PATENTS

| | | | |
|---|---|---|---|
| 2,009,913 | 7/1935 | Bever | 146—72 |
| 3,145,601 | 8/1964 | McDanal | 83—1 |

WILLIAM W. DYER, Jr., *Primary Examiner.*

W. GRAYDON ABERCROMBIE, *Examiner.*